United States Patent
Narayanan et al.

(10) Patent No.: US 6,922,404 B1
(45) Date of Patent: Jul. 26, 2005

(54) MOBILE IP EXTENSIONS RATIONALIZATION (MIER)

(75) Inventors: Raja P. Narayanan, Plano, TX (US); Mohamed Khalil, Murphy, TX (US); Emad A. Qaddoura, Plano, TX (US); Haseeb Akhtar, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 793 days.

(21) Appl. No.: 09/687,486

(22) Filed: Oct. 13, 2000

Related U.S. Application Data

(60) Provisional application No. 60/159,407, filed on Oct. 14, 1999.

(51) Int. Cl.[7] .......................... H04L 12/28; H04L 12/56; H04L 12/66; G06F 15/16; H04M 3/16
(52) U.S. Cl. ...................... 370/338; 370/352; 370/401; 455/411; 709/224
(58) Field of Search ................................ 370/328–349, 370/352–401, 220, 221; 709/224–227, 242, 202, 230, 231, 235, 241, 245; 455/411, 433, 435, 453, 432, 414

(56) References Cited

U.S. PATENT DOCUMENTS

| | | | | |
|---|---|---|---|---|
| 6,055,561 A | * | 4/2000 | Feldman et al. | 709/200 |
| 6,430,698 B1 | * | 8/2002 | Khalil et al. | 714/4 |
| 6,452,920 B1 | * | 9/2002 | Comstock | 370/349 |
| 6,466,964 B1 | * | 10/2002 | Leung et al. | 709/202 |
| 6,496,704 B2 | * | 12/2002 | Yuan | 455/466 |
| 6,501,746 B1 | * | 12/2002 | Leung | 370/338 |
| 6,523,068 B1 | * | 2/2003 | Beser et al. | 709/238 |
| 6,567,664 B1 | * | 5/2003 | Bergenwall et al. | 455/403 |
| 6,578,085 B1 | * | 6/2003 | Khalil et al. | 709/241 |
| 6,621,810 B1 | * | 9/2003 | Leung | 370/338 |
| 6,636,498 B1 | * | 10/2003 | Leung | 370/338 |
| 6,654,808 B1 | * | 11/2003 | Chuah | 709/227 |
| 6,687,251 B1 | * | 2/2004 | Mousseau et al. | 370/401 |
| 6,697,354 B1 | * | 2/2004 | Borella et al. | 370/352 |
| 6,804,221 B1 | * | 10/2004 | Magret et al. | 370/338 |
| 2002/0012433 A1 | * | 1/2002 | Haverinen et al. | 380/247 |
| 2003/0002468 A1 | * | 1/2003 | Khalil et al. | 370/338 |
| 2003/0060199 A1 | * | 3/2003 | Khalil et al. | 455/435 |

\* cited by examiner

*Primary Examiner*—Man U. Phan
(74) *Attorney, Agent, or Firm*—Randall Mishler; Dillon & Yudell LLP

(57) ABSTRACT

A new extensions structure for mobile IP control message extensions is employed to conserve the type field. Certain types of extensions, such as network access identifiers, are initially aggregated and subtypes are employed to identify the precise content of the extension (e.g., mobile node network access identifier, home agent network access identifier, foreign agent network access identifier, etc.). Long and short formats for the new extension structure are defined, with the long format applicable to nonskippable extensions carrying more than 256 bytes and the short format backwards compatible with currently defined skippable extensions with less than 256 bytes of data. This will greatly reduce usage of the type field.

21 Claims, 4 Drawing Sheets

| 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type | | | | | | | | Sub-Type | | | | | | | | Length | | | | | | | | | | | | | | | |
| Data... | | | | | | | | | | | | | | | | | | | | | | | | | | | | | | | |

*Fig. 2A*

| 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type | | | | | | | | Length | | | | | | | | Sub-Type | | | | | | | | | | | | | | | |
| Data... | | | | | | | | | | | | | | | | | | | | | | | | | | | | | | | |

*Fig. 2B*

| 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type | | | | | | | | Sub-Type | | | | | | | | SPI | | | | | | | | Length | | | | | | | |
| Authenticator... | | | | | | | | | | | | | | | | | | | | | | | | | | | | | | | |

MOBILE IP EXTENSIONS RATIONALIZATION (MIER)

RELATED APPLICATIONS

This application claims the benefit of commonly assigned, copending U.S. patent application Ser. No. 60/159,407 filed Oct. 14, 1999. The content of the above-identified application is incorporated herein by reference.

BACKGROUND OF THE INVENTION

1. Technical Field

The present invention generally relates to communications with mobile nodes in Internet Protocol (IP) networks and in particular to mobile IP control messages employed to configure communications for mobile nodes. Still more particularly, the present invention relates to the structure of extensions employed with mobile IP control messages.

2. Description of the Related Art

Explosive growth in the use of wireless or "mobile" communications devices to access Internet Protocol (IP) networks such as the Internet has lead to the development of IP mobility support, protocol enhancements which allow transparent routing of IP datagrams to mobile nodes within the Internet. These protocol enhancements support changes in the point of attachment for a mobile node from one network or subnetwork to another utilizing a home agent, a router on the mobile node's home network which maintains current location information for the mobile node and which tunnels datagrams for delivery to the mobile node when the mobile node is away from the home network, and a foreign agent, a router on a mobile node's "visited" network which provides routing services to the mobile node.

IP mobility support allows the mobile nodes, which each have a fixed "home" IP address corresponding to their home network(s), to register a "care-of" address with a foreign agent, where the care-of address is the termination point of a tunnel toward the mobile node for datagrams forwarded to the mobile node while it is away from home. Registration of the care-of address is achieved through a registration request and a registration reply, the general structures of which are illustrated in FIGS. 3A and 3B, respectively. Both the registration request and the registration reply include a fixed portion 302a and 302b followed by one or more extensions 304a and 304b.

The extensions 304a and 304b are part of a general extension mechanism employed by mobile IP to allow optional information to be carried by mobile IP control messages. In addition to registration requests and registration replys, agent discovery control messages, such as router advertisement and router solicitation messages defined for ICMP router discovery and employed by mobile IP for agent discovery, may also include extensions. Extensions allow variable amounts of information to be carried within each datagram. Each extension is encoded in the type-length-value format illustrated in FIG. 3C, in which:

Type Indicates the particular type of extension.
Length Indicates the length (in bytes) of the data field within the corresponding extension, NOT including the Type and Length bytes. The Length field is utilized to skip the Data field in searching for the next extension.
Data The particular data associated with the corresponding extension. This field may be zero or more bytes in length. The format and length of the Data field is determined by the Type and Length fields.

The Type field in the mobile IP extension structure can support up to 255 uniquely identifiable extensions. Several types are currently defined for mobile IP control messages:

32 Mobile-Home Authentication
33 Mobile-Foreign Authentication
34 Foreign-Home Authentication In addition, mobile IP defines the following types for extensions appearing within ICMP Router Discovery messages:

0 One-byte Padding (encoded with no Length or Data field)
16 Mobility Agent Advertisement
19 Prefix-Lengths As large scale mobile IP deployment becomes imminent, there are many proposals for new extensions for Mobile IP, creating a strong possibility that the available type space will be exhausted and generating a real need to conserve the type field within the extensions structure.

It would be desirable, therefore, to provide a new extensions structure for mobile IP control messages which would make the extensions truly extensible and secure.

SUMMARY OF THE INVENTION

A new extensions structure for mobile IP control message extensions is employed to conserve the type field. Certain types of extensions, such as network access identifiers, are initially aggregated and sub-types are employed to identify the precise content of the extension (e.g., mobile node network access identifier, home agent network access identifier, foreign agent network access identifier, etc.). Long and short formats for the new extension structure are defined, with the long format applicable to nonskippable extensions carrying more than 256 bytes and the short format backwards compatible with currently defined skippable extensions with less than 256 bytes of data. This will greatly reduce usage of the type field.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

Figures 2D, 2E, 3A:
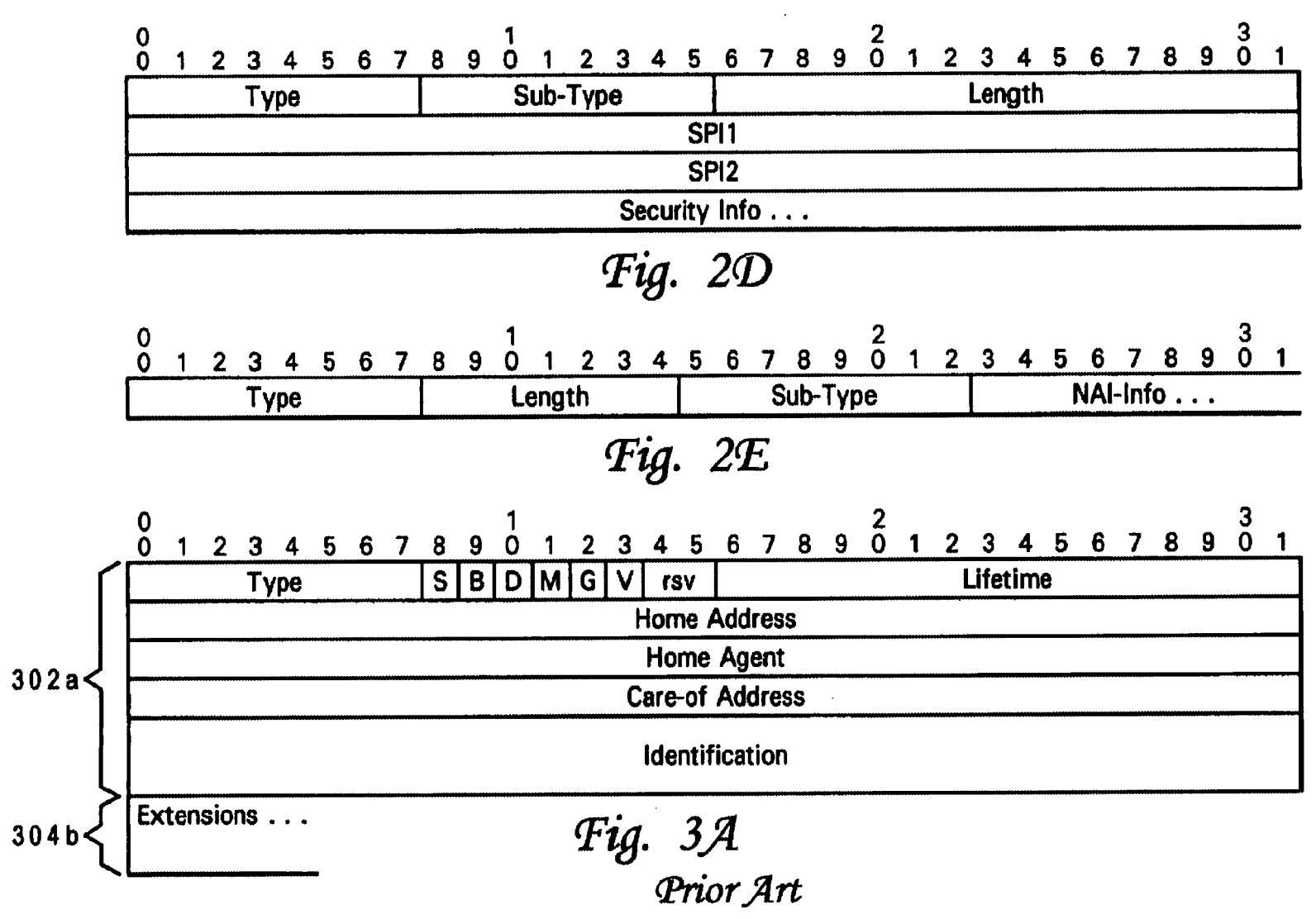

FIGS. 2A–2E are block diagrams of a mobile IP extensions format in accordance with a preferred embodiment of the present invention; and FIGS. 3A–3C are diagrams of mobile IP control messages and the existing mobile IP extension format.

DETAILED DESCRIPTION OF THE PREFERRED EMBODIMENT

Figure 1:
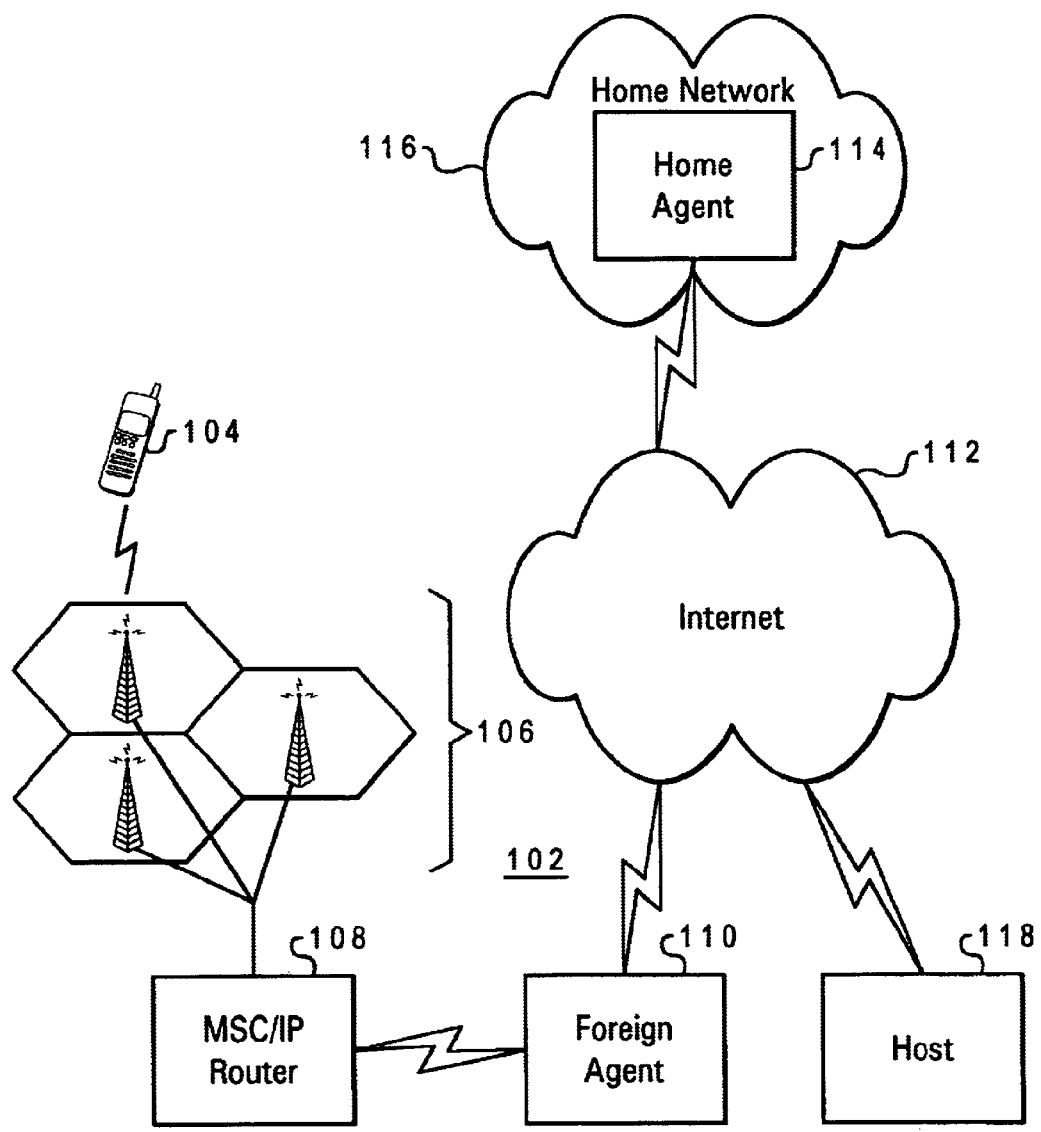
FIG. 1 depicts a diagram of a communications system in which a preferred embodiment of the present invention is implemented.
Figure 3B:
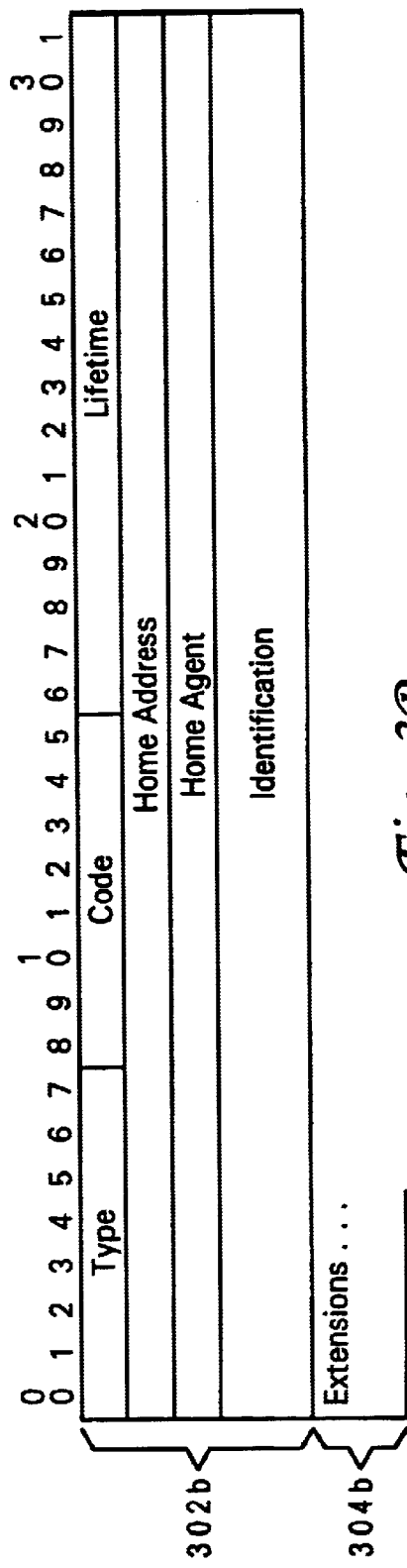
Figure 3C:
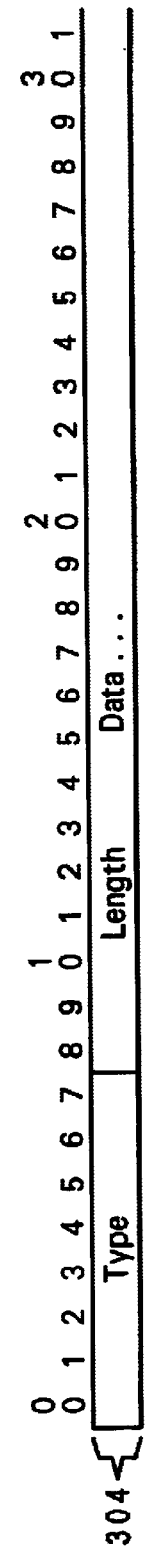

With reference now to the figures and in particular with reference to FIG. 1, a high level diagram of a communications system in which a preferred embodiment of the present invention is implemented is depicted. Communications system 102 includes a wireless communications device or mobile node 104, which is depicted as a wireless telephone in the exemplary embodiment but which may be any wireless device employing IP data communications, such as a laptop or personal digital assistant (PDA). Wireless communications infrastructure 106 (including base stations, routers, and the like) enable mobile node 104 to communicate with an attachment point 108, which in the exemplary embodiment is a mobile switching center (MSC) and IP router. Mobile node 104 need not be a wireless communications device as depicted, but may instead be a device which employs a wired connection capable of attachment to the Internet at different locations, within different networks and subnetworks.

Communications system 102 also includes a foreign agent (FA) 110, a router which provides routing services to the mobile node 104. Although depicted as separate from attachment point 108 for mobile node 104, foreign agent 110 may actually be integrated with the attachment point 108. Foreign agent 110 is connected to the Internet backbone 112, to which is also connected the home agent 114 for mobile node 104, which is a router within the home network 116 for mobile node 104, and host system 118, which may be any server or peer host system with which mobile node 104 is attempting to communicate.

In operation, mobility agents (including foreign agent 110 and home agent 114) advertise their presence via agent advertisement messages (which may optionally be solicited by any locally attached mobile node through an agent solicitation message). Mobile node 104 received the agent advertisement messages and determines whether it is attached to its own home network or to a foreign network. When mobile node 104 detects that it is attached to a foreign network, it obtains a care-of address (e.g., from the agent advertisements of foreign agent 110). Mobile node 104 then registers the care-of address with its home agent 114 utilizing the registration request and registration reply. Subsequently, datagrams sent to the home IP address of mobile node 104 from host system 118 are intercepted by home agent 114 and tunneled to the care-of address, received at the tunnel endpoint (either foreign agent 110 or mobile node 104 itself) and finally delivered to mobile node 104. Datagrams sent by mobile node 104 to host system 118 are generally delivered using standard IP routing mechanisms.

Mobile IP control messages employed to establish the connection of mobile node 104 to foreign agent 110, including any agent advertisements, the registration request, and the registration reply, all employed the improved mobile IP extensions format in accordance with the present invention, as described in further detail below.

Referring to FIGS. 2A–2B, block diagrams of a mobile IP extensions format in accordance with a preferred embodiment of the present invention are illustrated. FIG. 2A illustrates the long extension format in accordance with the present invention, which is applicable for non-skippable extensions which carry information or more than 256 bytes and should be applicable to any future standardization which addresses non-skippable extensions accommodating up to 64 KBytes of data. The general structure of the long extension format includes the following fields:

Type Indicates the type, which describes a collection of extensions having a common data type.

Sub-Type Includes a unique number assigned to each member in the aggregated extension type. Sub-Type values between 200 and 255 should be reserved for future use and standardization.

Length Indicates the length (in bytes) of the data field within the corresponding extension; does NOT include the type, length and sub-type bytes.

Data The particular data associated with the corresponding extension, which may be represented in many ways.

FIG. 2B illustrates the short extension format in accordance with the present invention, which is backward compatible with the skippable extensions currently defined for mobile IP control messages and is applicable for extensions which do not require more than 256 bytes of data. The general structure of the short extension format consists of the following fields:

Type Indicates the type, which describes a collection of extensions having a common data type.

Sub-Type Includes a unique number assigned to each member in the aggregated extension type. Sub-Type values between 200 and 255 should be reserved for future use and standardization.

Length Indicates the length (in bytes) of the data field within the corresponding extension; does NOT include the type, length and sub-type bytes.

Data The particular data associated with the corresponding extension, which may be represented in many ways.

In the present invention, the type field of the extensions format identifies the format of the remainder of the extension (i.e., whether the length or sub-type field follows the type field), as well as whether the extension is skippable or nonskippable. Common types of extensions, such as network access identifier (NAI) extensions, are aggregated under a single type identifier, with sub-type identifiers distinguishing different content-types for the extension (e.g., mobile node or user network access identifier, home agent network access identifier, etc.). This will greatly reduce the usage of the extension type field.

FIGS. 2C through 2E illustrate specific mobile IP extensions employing the extensions formats of the present invention. FIGS. 2C and 2D illustrate extensions utilizing the nonskippable long format, while FIG. 2E illustrates an extension utilizing the skippable short format.

FIG. 2C illustrates a generic authentication extension, which consists of the following fields:

Type Contains the authentication extension type identifier.

Sub-Type Describes the type of entity which owns the corresponding authentication extension. The following identifiers are defined:

1 MN-AAA (mobile node authentication, authorization and accounting) extension.

Length The length of the Authenticator field.

SPI Security Parameters Index, a 32 bit number indexing and uniquely identifying a security association (SA) (the shared secret keys, security attributes and policy defined for protection of traffic between any two nodes in a network) within a database.

Authenticator The variable length authenticator field contains a random value of at least 128 bits.

FIG. 2D illustrates a general session key extension, which defines a general purpose security association extension carrying information necessary to establish security association between different entities within the mobile IP model (e.g., mobile node-foreign agent, foreign agent-home agent, mobile node-home agent) and consists of the following fields:

Type Contains the generic AA key extension type identifier.

Sub-Type Defines the type of entity which owns the key address:

0 MN-HA (mobile node-home agent) key

1 MN-FA (mobile node-foreign agent) key

2 FA-HA (foreign agent-home agent) key

Length The length of the SA-INFO field.

SPI1 A 32 bit opaque value indicating the SPI which the mobile node must use to determine which algorithm to employ for recovering the security information.

SPI2 A 32 bit opaque value which the mobile node MUST use to index all the necessary information recovered from the foreign agent security information after decoding.

Security Info The necessary information (including the key, algorithm, etc.) required by the mobile node to create a mobility security association between itself and another entity such as a home agent or foreign agent.

FIG. 2E illustrates a general network access identifier (NAI) extension for different types of entities such as a mobile node, home agent, foreign agent, etc., and which consists of the following fields:

Type Contains the NAI aggregate extension type identifier.
Sub-Type Defines the type of entity which owns the key address:
 0 MN-HA (mobile node-home agent) key
 1 MN-FA (mobile node-foreign agent) key
 2 FA-HA (foreign agent-home agent) key
Length The length of the NAI-INFO field.
NAI-INFO Contains the NAI in a string format.

By aggregating extension types, space within the type field of the mobile IP extensions structure is conserved. Extensions are preferably aggregated based on common data formats (e.g., network access identifiers, security associations, etc.). Sub-types are then employed to precisely identify extension content.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A mobile Internet Protocol extension, comprising:
 a type field containing a type value identifying a collection of extensions having a common data type;
 a sub-type field containing a unique number assigned to a member of the collection of extensions identified by the type value within the type field; and
 a data field containing the data associated with the extension, wherein the type field contains a type value identifying a group of authentication extensions and the data field contains a security parameter index and an authenticator.

2. The mobile Internet Protocol extension of claim 1, further comprising:
 a length field indicating a length in bytes of the data field within the extension.

3. The mobile Internet Protocol extension of claim 1, wherein the sub-type field follows the type field within a short format for the extension.

4. The mobile Internet Protocol extension of claim 1, wherein the sub-type field is separated from the type field by a length field within a long format for the extension.

5. The mobile Internet Protocol extension of claim 1, wherein the type field is a first field within the extension, followed by the sub-type field and then a length field within a long format or the extension and followed by the length field and then the sub-type field within a short format for the extension.

6. A mobile Internet Protocol extension comprising:
 a type field containing a type value identifying a collection of extensions having a common data type;
 a sub-type field containing a unique number assigned to a member of the collection of extensions identified by the type value within the type field; and
 a data field containing the data associated with the extension, wherein the type field contains a type value identifying a group of key extensions and the data field contains a first security parameter index, a second security parameter index, and security information required to create a security association.

7. The mobile Internet Protocol extension of claim 1, wherein the type field contains a type value identifying a group of network access identifiers and the data field contains a network access identifier.

8. A method of extending control messages within a mobile Internet Protocol network, comprising:
 storing a type value identifying a collection of extensions having a common data type within a type field for a message extension;
 storing a type value identifying a group of authentication extensions within the type field, wherein the data field contains a security parameter index and an authenticator;
 storing a unique number assigned to a member of the collection of extensions identified by the type value within the type field within a sub-type field for the message extension; and
 storing the data associated with the extension within a data field for the message extension.

9. The method of claim 8, further comprising:
 storing a length in bytes of the data field within a length field for the message extension.

10. The method of claim 8, further comprising:
 placing the sub-type field after the type field within a short format for the message extension.

11. The method of claim 8, further comprising:
 placing a length field between the sub-type field and the type field within a long format for the extension.

12. The method of claim 8, further comprising:
 placing the type field first within the extension, followed by the sub-type field and then a length field within a long format for the extension and followed by the length field and then the sub-type field within a short format for the extension.

13. A method of extending control messages within a mobile Internet Protocol network comprising:
 storing a type value identifying a collection of extensions having a common data type within a type field for a message extension;
 storing a type value identifying a group of key extensions within the type field, wherein the data field contains a first security parameter index, a second security parameter index, and security information required to create a security association;
 storing a unique number assigned to a member of the collection of extensions identified by the type value within the type field within a sub-type field for the message extension; and
 storing the data associated with the extension within a data field for the message extension.

14. The method of claim 8, wherein the step of storing a type value identifying a collection of extensions having a common data type within a type field for a message extension further comprises:

storing a type value identifying a group of network access identifiers within the type field, wherein the data field contains a network access identifier.

15. An Internet Protocol network supporting mobile connections, comprising:

a mobile communications device;

a home agent within a home network for the mobile communications device;

a foreign agent within a network to which the mobile communications device is connected, wherein the home agent and the foreign agent communicate utilizing control messages which may be extended by an extension including:

a type field identifying a collection of extensions having a common data type, a sub-type field identifying a member of the collection of extensions identified by the type field, and a data field containing the data associated with the extension, wherein the type field identifies a group of extensions selected from the group including an authentication extension, a key extension, and a network access identifier extension.

16. The network of claim 15, wherein the sub-type field is placed in a first location within the extension for a short format of the extension and in a second location within the extension for a long format of the extension.

17. The network of claim 15, wherein the extension includes a length field specifying a length of the data field in bytes.

18. A mobile Internet Protocol extension comprising:

a type field containing a type value identifying a collection of authentication extensions having a common data type;

a sub-type field containing a unique number assigned to a member of the collection of authentication extensions identified by the type value within the type field; and a data field containing the data associated with the authentication extension, wherein space within the type field is conserved by aggregating extension types identified by the type value.

19. The mobile Internet Protocol extension of claim 18, wherein the mobile Internet Protocol operates in Layers 5–7 of the Open System Interconnection (OSI) model.

20. The mobile Internet Protocol extension of claim 18, wherein the collection of extensions are all network access identifiers.

21. A mobile Internet Protocol extension comprising:

a type field containing a type value identifying a collection of extensions having a common data type, wherein the collection of extensions is all AAA (Authentication, Authorization and Accounting) key extensions;

a sub-type field containing a unique number assigned to a member of the collection of extensions identified by the type value within the type field; and a data field containing the data associated with the extension, wherein space within the type field is conserved by aggregating extension types identified by the type value.

\* \* \* \* \*

UNITED STATES PATENT AND TRADEMARK OFFICE
CERTIFICATE OF CORRECTION

| | | |
|---|---|---|
| PATENT NO. | : 6,922,404 B1 | |
| APPLICATION NO. | : 09/687486 | |
| DATED | : July 26, 2005 | |
| INVENTOR(S) | : Narayanan et al. | |

It is certified that error appears in the above-identified patent and that said Letters Patent is hereby corrected as shown below:

In the Claims

Column 6, lines 21-35, please replace Claim 8 as follows:

8. A method of extending control messages within a mobile Internet Protocol network, comprising:

storing a type value identifying a collection of extensions having a common data type within a type field for a message extension;

storing a type value identifying a group of authentication extensions within the type field, wherein a data field contains a security parameter index and an authenticator;

storing a unique number assigned to a member of the collection of extensions identified by the type value within the type field within a sub-type field for the message extension; and storing the data associated with the extension within the data field for the message extension.

Signed and Sealed this
Twenty-fourth Day of March, 2015

Michelle K. Lee
*Director of the United States Patent and Trademark Office*